United States Patent
Coulibaly et al.

[11] Patent Number: 5,905,651
[45] Date of Patent: May 18, 1999

[54] PARTS IDENTIFICATION SYSTEM FOR POWDER SPRAY COATING SYSTEM

[75] Inventors: Eric Coulibaly, Elyria; Cynthia A. Skelton-Becker, Rocky River; John Faetanini, Amherst, all of Ohio

[73] Assignee: Nordson Corporation, Westlake, Ohio

[21] Appl. No.: 08/784,236

[22] Filed: Jan. 16, 1997

[51] Int. Cl.$^6$ .................................................. G06K 9/46
[52] U.S. Cl. ........................ 364/469.02; 364/468.01; 364/468.23; 382/141
[58] Field of Search ............... 382/100, 141, 382/152, 199, 181, 281, 232–253, 254–275; 364/468.01, 468.02, 470.14, 479.14, 552, 469.02; 118/668, 670, 686, 691, 713, 729; 427/2.1, 8

[56] References Cited

U.S. PATENT DOCUMENTS

| | | |
|---|---|---|
| 3,192,796 | 7/1965 | Peeps et al. |
| 3,593,308 | 7/1971 | Fagan .................................... 118/697 |
| 3,646,521 | 2/1972 | Porter .................................... 118/668 |
| 3,739,742 | 6/1973 | Racz et al. ............................ 118/684 |
| 4,357,900 | 11/1982 | Buschor ................................ 118/681 |
| 4,421,800 | 12/1983 | Schoenberg et al. ................. 427/424 |
| 4,603,329 | 7/1986 | Bangerter et al. .................... 340/679 |
| 4,712,248 | 12/1987 | Hongo .................................. 382/199 |
| 4,747,153 | 5/1988 | Kouno et al. ......................... 382/203 |
| 5,175,018 | 12/1992 | Lee et al. .............................. 427/8 |
| 5,271,953 | 12/1993 | Litteral ................................. 427/8 |
| 5,280,433 | 1/1994 | Ettinger et al. ................... 364/469.02 |
| 5,298,277 | 3/1994 | Hirose .................................. 427/8 |
| 5,519,784 | 5/1996 | Vermeulen et al. .................. 382/100 |
| 5,534,067 | 7/1996 | Fulker et al. ......................... 118/681 |
| 5,689,415 | 11/1997 | Calotychos et al. ................. 364/172 |
| 5,718,767 | 2/1998 | Crum et al. .......................... 118/669 |

FOREIGN PATENT DOCUMENTS

| | | | |
|---|---|---|---|
| 3014500 | 10/1973 | Germany | B05B 13/04 |

Primary Examiner—James P. Trammell
Assistant Examiner—Demetra R. Smith
Attorney, Agent, or Firm—Rankin, Hill, Porter & Clark LLP

[57] ABSTRACT

Parts to be treated in a powder spray coating system are identified by moving the parts relative to an array of sensors. A plurality of sensor readings is created by sensing the presence or absence of a portion of one of the parts proximate to each of the sensors for a plurality of incremental distances that the parts have moved relative to the sensors. The sensor readings are compressed according to a computational procedure to generate compressed data for each of the parts, the compressed data representing the sensor readings for all of the sensors during each incremental distance, and the compressed data representing the sensor readings for all of the incremental distances of each of the sensors. The compressed data is compared with corresponding data for an identified part to determine if the part matches the identified part. The system provides for more detailed parts identification than light curtains, but avoids the expense and memory requirements of sophisticated vision systems.

33 Claims, 5 Drawing Sheets

System Part Identification Setup

Sensor Operation Mode Setup
- All Photoeyes: 0
- Alarm Delay
- Reset Queues

Last Six Hook Lengths
- HOOK_DIST 1 = 0
- HOOK_DIST 2 = 0
- HOOK_DIST 3 = 0
- HOOK_DIST 4 = 0
- HOOK_DIST 5 = 0
- HOOK_DIST 6 = 0

0

PART ID STATUS? PART ID ON

Booth 1 Queue
- Part ID Stand 0
- 0   0
- 0
- 0   Bth Entr
- 0
- 0
- 0

Hook: 1, 5, 10, 15, 20, 25 / 27, 31, 36, 41, 46, 51
Exit View
LAST RACK VIEWED: 0

FIG. 7

System Part Teach / Modify

| Rack To Teach or Modify | Rack # | PREV NEXT |
|---|---|---|
| RS00RDRD | 2 | ◄ ► |

System ID Mode: Teach (TCH RUN)

| Normal Recipe | Rework Recipe |
|---|---|
| 30 | 3 |

| Location | Part # | Part Name |
|---|---|---|
| A Top Left | 0 | LID |
| B Top Right | 0 | LID |
| C Bottom Left | 0 | LID |
| D Bottom Right | 0 | LID |

Viewing Rack #: 0

ID System Status: OFF
Max No. of Rackes = 120

Save Part Data Only
Save To PLC | Delete from PLC

Width Deadband (counts) 0   Passband 0
Heigth Deadband (counts) 0   Passband 0

PARTS IDENTIFICATION SYSTEM FOR POWDER SPRAY COATING SYSTEM

BACKGROUND OF THE INVENTION

1. Field of the Invention

This invention relates to the recognition of parts entering processing systems, and more particularly to the recognition of parts entering powder spray coating systems in order to control the spraying of the parts in a more efficient manner.

2. Description of the Prior Art

In electrostatic powder painting, products or parts to be coated are moved through an enclosure or booth where one or more spray guns spray the powder onto the products. The spray guns impart a charge to the powder particles, either triboelectrically or with a high voltage charging electrode. When the powder particles are sprayed from the guns, the particles are electrostatically attracted to the parts to be painted which are generally electrically grounded and which are typically suspended from an overhead conveyor or otherwise carried through the spray booth. Once these charged powder particles are deposited onto the parts, they adhere there by electrostatic attraction until the parts are subsequently conveyed into an oven where the particles are melted to flow together to form a continuous coating on the parts. Powder coating generally provides a tough and durable finish such as would be found on many appliances, garden furniture, lawn mowers, and many other products.

Recently, distributed control systems have been developed for powder coating systems which permit precise control of spray gun operations within the spray booth. An example of such a control system in shown in U.S. patent application Ser. No. 08/320,882, filed Oct. 5, 1994, and assigned to the assignee of the present invention. These control systems permit the development of a "recipe" for spraying each different individual part according to the configuration of the part and powder spraying needs applied to that part, so that the control system can position the spray guns, if necessary, and trigger the spray guns at the appropriate times. For example, if a part has a gap at a particular location, the control system can turn off the spray guns to reduce wasted powder. However, such control systems require an accurate and precise identification of the part or parts to be sprayed.

Several different approaches have been developed in a attempt to recognize precisely the parts in an automated spray coating system. One approach to parts recognition has been to provide an array of photo eyes or light curtains in vertical and horizontal directions at the entrance to the spray booth. These conventional photo eye or light curtain systems have a number of drawbacks, such as a very limited ability to provide appropriate part recognition information. While such systems may indicate the general size and shape of the parts entering the spray booth, in many cases the information is insufficient because it is necessary to recognize different part types which may have similar overall dimensions.

Another approach has been to provide sophisticated vision systems. Standard vision systems take a pixel-matrix view of an object and use standard filtering techniques to search for given features. If the features match, the part is recognized. These systems provide much better part recognition information, but they also have several serious disadvantages. First, the systems are very expensive due to the sophisticated optical recognition systems and required computing capabilities. Second, the systems require large computing capabilities, including large memory requirements, which are generally not present in most existing spray coating control systems.

SUMMARY OF THE INVENTION

The present invention provides for the identification of parts in a unique and efficient manner, which affords greater and more accurate identification of parts while maintaining simplicity and making efficient use of limited computer resources. While the present invention utilizes some of the concepts of expensive and sophisticated vision systems, including a pixel-matrix array, it does so using a unique coding and filtering technique which reduces the need for expensive equipment and large computing capabilities.

In accordance with the present invention, an array of photo eyes or other sensors is used, and the output of the sensors is arranged in a matrix from which the data is compressed into a format which utilizes the sums of binary data values. The summed values or "sigma values" allows the data for each part to be stored in a compressed format which requires relatively little memory. The system of the present invention can thus be advantageously employed in existing spray coating system controllers in which there are limited memory resources and which other systems, such as optical recognition systems, cannot be used because of their requirements for large memory and powerful computer capabilities. The system of the present invention is also much less expensive than optical recognition systems, since it does not require the sophisticated equipment of such systems.

The present invention recognizes parts by employing a filtering technique which utilizes adjustable error tolerances which allow for accurate and consistent parts identification. The error tolerances are input by the operator in the form of "deadband" and "passband" values, as these terms are used in this application. These settings are adjustable depending upon system conditions. The filter techniques utilizes the sigma format of data compression to identify parts using minimum computing requirements.

The parts recognition system of the present invention also has a unique data entry mode which avoids the use of extensive programming and setup for the inputting of parts data. The operator merely places the system in the teach mode, and as a part passes through the system, the data is collected and compressed and saved in the compressed format. Any other information associated with the part, such as processing variables, component names and finishing recipes, can also be recorded at this time. Unlike many identification systems of the prior art, the system of this invention allows a person who is not a programmer to enter the identification information on a complete array of parts into the system. It is not necessary engage in skilled programing functions to setup the system to identify a specific part or to program the system to recognize particular features in parts in order to accomplish subsequent identification.

These and other advantages are provided by the present invention of a method of identifying parts comprising the steps of moving the parts relative to an array of sensors; creating a plurality of sensor readings by sensing the presence or absence of a portion of one of the parts proximate to each of the sensors for a plurality of incremental distances that the parts have moved relative to the sensors; compressing the sensor readings according to a computational procedure to generate compressed data for each of the parts, the compressed data representing the sensor readings for all of the sensors during each incremental distance, and the compressed data representing the sensor readings for all of the incremental distances of each of the sensors; and comparing the compressed data with corresponding data for an identified part to determine if the part matches the identified part.

DETAILED DESCRIPTION OF THE PREFERRED EMBODIMENT

Figure 1:
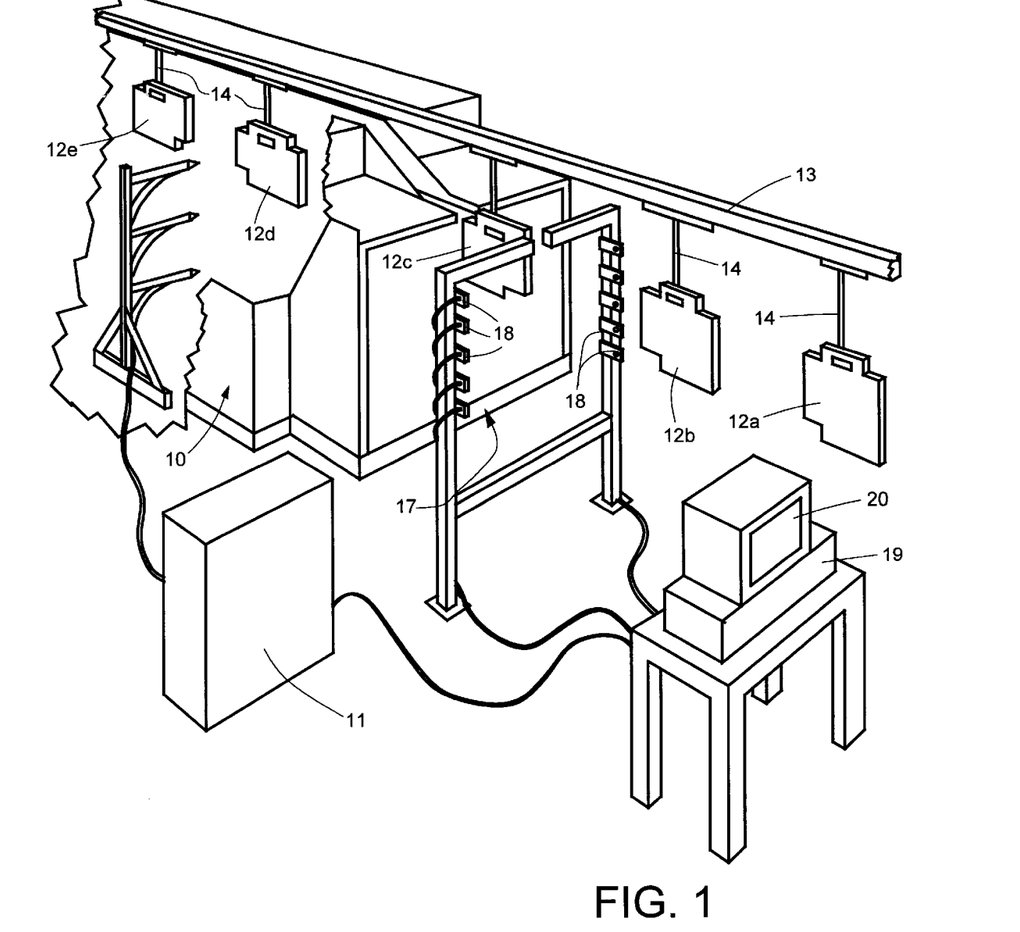
FIG. 1 is a schematic view of a powder spray coating system which incorporates the part identification system of the present invention.

Referring more particularly to the drawings and initially to FIG. 1, there is shown schematically a paint spray system which includes a paint spray booth 10 having spray guns under control of a control system 11. The control system 11 may be the Smart Coat control system, available from Nordson Corporation, of Westlake, Ohio, and described in U.S. patent application Ser. No. 08/320,882, filed Oct. 5, 1994, the disclosure of which is hereby incorporated by reference in its entirety. Parts 12a–12e are supplied to the booth 10 by means of a conveyor 13. In the embodiment shown, the parts 12a–12e are suspended from hooks or hangers 14 which are, in turn, mounded on a horizontally moving conveyor line 13. For the sake of clarity, the parts 12a–12e are shown schematically in simplified form, and it should be understood that the parts are typically more complex or that assemblies of various and different sized items may be grouped together on a rack, and that such a rack of items would be treated herein as a single "part" 12.

As the parts 12a–12e are moved by the conveyor 13, they pass through a sensor array 17. The sensor system shown in FIG. 1 comprises 10 sensors 18 arranged vertically adjacent to the conveyor line 13. The sensors 18 are connected to a controller 19 which has a display 20. The controller 19 may be a small computer system, or it may be part of a larger control system used to operate the spray booth 10, such as the control system 11.

While 10 sensors 18 are shown for the sake of clarity in FIG. 1, it should be understood that a greater or lesser number of sensors may be used, and in a preferred embodiment there would be 25 sensors. The vertical distance between the sensors depends upon the size of the overall system including the size of the spray booth and the size of the parts being detected. The sensors may be between ½ inch and 2 inches apart, but a greater or lesser distance may be used as needed. Each of the sensors may be, for example, photoeyes comprising a light source and a photo sensitive detector which detects light reflected off the part from the light source. A suitable sensor would be a Model 303-20 sensor, manufactured by Scientific Technologies, Inc. of Fremont, Calif. Alternatively, the sensors may be ultrasonic sensors having piezoelectric transmitters/receivers returning an analog signal proportional to the distance from the part to the sensor. Further alternatively, the sensors may be a light curtain comprising "photoeyes" in the form of a series of LEDs and photoreceivers with a controller that polls pairs of sensors and returns an analog signal proportional to the number of photoeyes broken or last broken. Other sensors may also be used, such as other types of photocells, industrial proximity sensors, or impedance or capacitance sensors.

Figure 2:
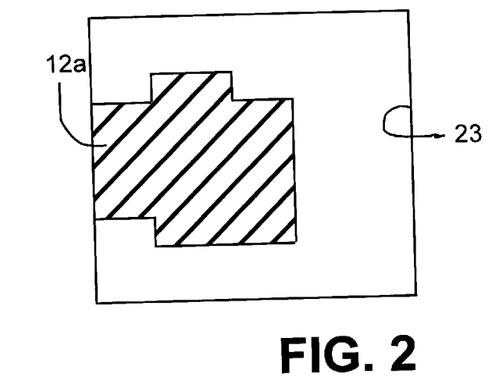
FIG. 2 is a schematic view of the shadow of a part identified by the system in its teach mode within a detection window.
Figure 3:
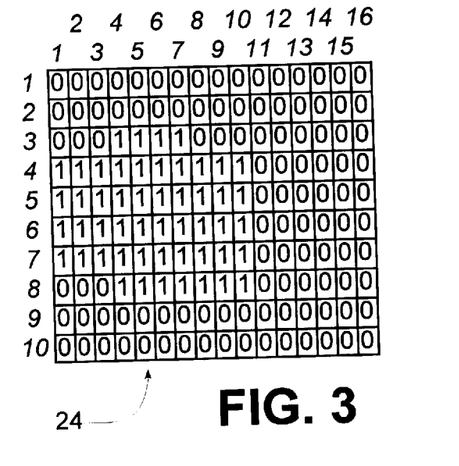
FIG. 3 is a matrix derived from the part of FIG. 2.

As each part 12 moves past the sensor array 17, each of the sensors 18 detect the presence or absence of the part adjacent to the sensor for a portion of the part. The parts 12 move through the sensor array 17 at the speed of the conveyor 13, and the sensors 18 are controlled to detect the presence or absence of a portion of the part for an incremental amount of movement of the conveyor, so that the incremental amount of conveyor movement corresponds to an incremental portion of the width of the part. The movement of the conveyor 13 can be detected by an encoder attached to the conveyor, with each count of the encoder corresponding to one of the incremental portions of the width of the part. The sensors 18 thus sense the presence or absence of a portion of the part proximate to each of the sensors for a plurality of incremental distances that the part has moved relative to the sensors. When one of the parts 12 has passed through the sensor array 17, a matrix can be developed in which each row represents one of the sensors (or an increment of the height of the part) and each column represents each conveyor movement increment (or width increment of the part). For example, FIG. 2 represents a part 12a which may be detected by the simplified sensor array 17 shown in FIG. 1 comprising 10 sensors. The part 12a in this example fits within a detection window 23 in which the height of the window represents the height of the sensor array 17 and the width of the window is represents an amount of travel of the conveyor 13. The recording of the matrix is begun as soon as any one sensor 18 senses the presence of a part. Therefore, the part image will always be at one side of the window 23 (the left hand side of the window as shown in FIG. 2). If in this example each conveyor movement is ½ inch, and if the sensing is performed for 8 inches, a 10 by 16 matrix 24 is created as shown in FIG. 3. This 10 by 16 matrix 24 matches the detection window 23 of FIG. 2. There is a binary value in each cell in the matrix 24, with a "1" indicating the presence of a portion of the part proximate to that sensor during that conveyor movement increment, and a "0" indicating the absence of any portion of the part proximate to that sensor during that conveyor movement increment.

Figure 4:
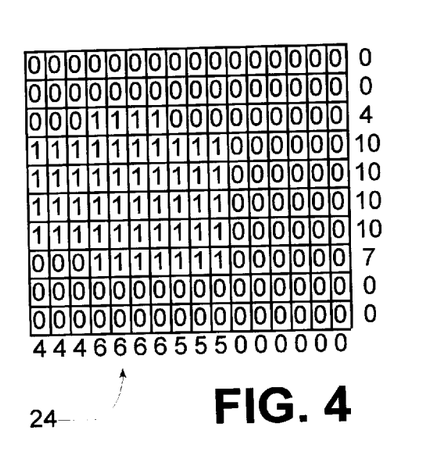
FIG. 4 is another view of the matrix of FIG. 3 with row sums and column sums applied.

The system of the present invention is capable of operating in two different modes: a "teach" mode and an "identification" or "run" mode. The information needed to recognize each part is first obtained by the system by operating the system in the teach mode. As the part is run through the system, a matrix is developed which represents the foot print of that part. A computational procedure is then preformed on the values in each of the rows and in each of the columns to obtain compressed data. Preferably, the values in each row and in each column in the matrix are summed, respectively, and these column sums and row sums are stored as the representation of the part, so that the data for the part is compressed and stored as "sigma" data. For example, for the part 12a shown in FIG. 2, the matrix 24 shown in FIG. 3 is derived. The values in each row and in each column are summed, respectively, as shown in FIG. 4, and the part 12a is then represented in compressed form by the row sigma or the row sum string of "0, 0, 4, 10, 10, 10, 10, 7, 0, 0" and the column sigma or column sum string of "4, 4, 4, 6, 6, 6, 6, 5, 5, 5, 0, 0, 0, 0, 0, 0." The teach mode is run for each part to be identified and row and column sum values or sigma values are obtained for each part and stored in memory. When the sigma values are stored in memory, the operator enters a part identification number and/or name along with desirable information about the part such as its spraying "recipe," which the information used to treat the part when it enters the spray booth, such as duration of spray, flow rates, gun placement (if gun is movable), etc.

It can be seen that since the information saved for the part is in a "sigma format" the overall amount of data saved is rather small and takes up little memory. This provides unique advantages in use of the system of the present invention in existing spray coating system controllers in which there are limited memory resources. The system of this invention is thus advantageously utilized in existing systems in which other systems, such as optical recognition systems, cannot be used because of the cost associated with their computing requirements.

Unlike many identification systems of the prior art, the system of this invention allows a person who is not a programmer to enter the identification information on a complete array of parts into the system using the teach mode. The operator merely places the system in the teach mode, and as a part passes through the system, the column and row sums are recorded and saved as a new part. Any other information associated with the part, such as processing variables, component names and finishing recipes, can also be recorded at this time. It is not necessary to program the system to identify a specific part or to program to system to recognize particular features in parts in order to accomplish subsequent identification.

After accumulating identification information in the teach mode, the system can be operated in the identification mode, in which parts 12 are conveyed through the sensor array 17 and the parts are scanned. The identification sigma information for each part 12 is compared with the sigma values previously stored in memory. This comparison is accomplished using a "deadband" error tolerance and using a "passband" tolerance to allow some rows or columns to be out of the "deadband" tolerance. The "deadband" tolerance represents the acceptable variance between any row sum or column sum value which is still considered to be a passing value. The "passband" tolerance represents the number of non-passing values in either the row sums or the column sums which is still considered to be a match. These tolerances permit the part to be out of tolerance and still be recognized by the system. If a part is identified as a match with a part for which information is stored in memory, the part identification information is passed on to the control system 11. If the part does not match any programmed part, a mismatch code is assigned to the part and passed on for processing. After the system has identified a part, it then calls up the recipe from memory associated with that part. The part identification and the recipe are then fed to the control system so that the part is properly sprayed.

Figure 5:
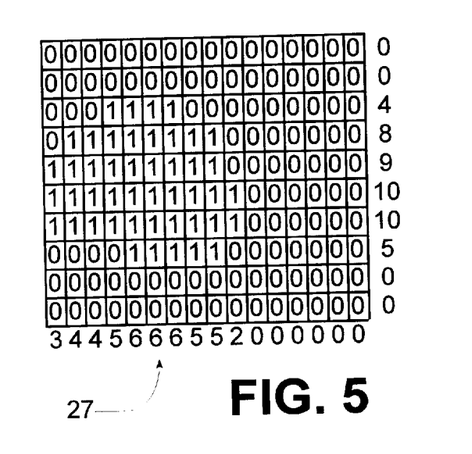
FIG. 5 is a view of a matrix similar to FIG. 4 derived from a part detected by the system in its run mode.

For example, FIG. 5 represents a matrix 27 obtained for a part passing through the system in the identification mode. In comparing the matrix 27 with the matrix 24 of FIG. 4 it is apparent that the row sum for the fourth row in the matrix 27 is "8" while the corresponding row sum in the matrix 24 is "10." If the "deadband" setting permits a variation of 1, then the fourth row would not pass. In further comparing the matrices 24 and 27, it is apparent that the row sum for the eighth row in the matrix 27 is "5" while the corresponding row sum in the matrix 24 is "7." If the "deadband" setting permits a variation of 1, then the eighth row would not pass. In comparing the matrices 24 and 27, it is further apparent that the row sum for the fifth row in the matrix 27 is "9" while the corresponding row sum in the matrix 24 is "10." If the "deadband" setting permits a variation of 1, then the fifth row would pass. Thus for a "deadband" setting of 1 for the rows, there are 8 passing rows and 2 non-passing rows. If the "passband" setting for the rows is "2," this part would be considered as match of the part 12a of FIG. 2. If however, the "passband" setting for the rows is "1" the part would not match, since there are 2 non-passing rows.

Alternatively, in the example of FIG. 5, if the "deadband" setting for the rows changed from "1" to "2," then the fourth and eighth row as well as the fifth row would pass, and, if the "passband" setting for the rows is kept at "2," the part would match.

The same technique is applied to the column sums. In the example of FIGS. 4 and 5, the matrix 27 differs from the matrix 24 in the first column which has a sum of "3" instead of "4," in the fourth column, which as a sum of "5" instead of "6," and in the tenth column which has a sum of "2" instead of "5." If the "deadband" setting for the columns is "1" or "2," the first and fourth columns would pass, and the tenth column would fail. If the "passband" setting for the columns is "1" or higher, the part would match because only one column, i.e., the tenth column, failed.

Separate "deadband" and "passband" settings may be provided for the rows and columns or for portions of the rows and columns. It is preferred, however, that a single "deadband" and "passband" setting for the rows, and another single "deadband" and "passband" settings for the columns, because additional settings make the system more difficult to set up and operate. The "deadband" and "passband" settings for the rows and columns can be adjusted depending upon the conditions experienced, including the size and variety of parts, the frequency with which parts are conveyed in different orientations, and size of the matrix, and other factors. The "deadband" and "passband" settings are adjusted by the operator so as to sense each part and distinguish it from the other parts coming down the conveyor line.

The terms "deadband" and "passband" are used in this application to indicate the specific types of tolerances incorporated into this identification system which allow parts identified during in the identification mode to pass even though they do not exactly match the footprint of the part obtained during the teach mode. It should not be inferred that these terms are used in a manner which may be conventional in terminology used in other filtering applications or in any other manner.

The matrix 24 used in the examples herein and shown in FIGS. 3 and 4 has been simplified for the sake of clarity, and it should be understood that typically more sensors would be used and that detection would occur for a greater amount of conveyor movement or for smaller increments of conveyor movement. In one preferred embodiment, for example, there would 52 sensors, 26 on each side of the parts, and the sensing is preformed every ½ inch for 20 inches, so the matrix would have 52 rows and 40 columns. However, the example illustrated by FIGS. 2–4 would also be suitable for applications in which part identification could be derived from a 10 by 16 matrix and a larger matrix may be needed in other situations. Thus the number of sensors, the amount of conveyor movement, the amount of conveyor movement represented by each increment, and the number of increments used, and thus the size of the matrix may all be adjusted depending upon the application in which the parts identification system of the present invention is utilized.

Figure 6:
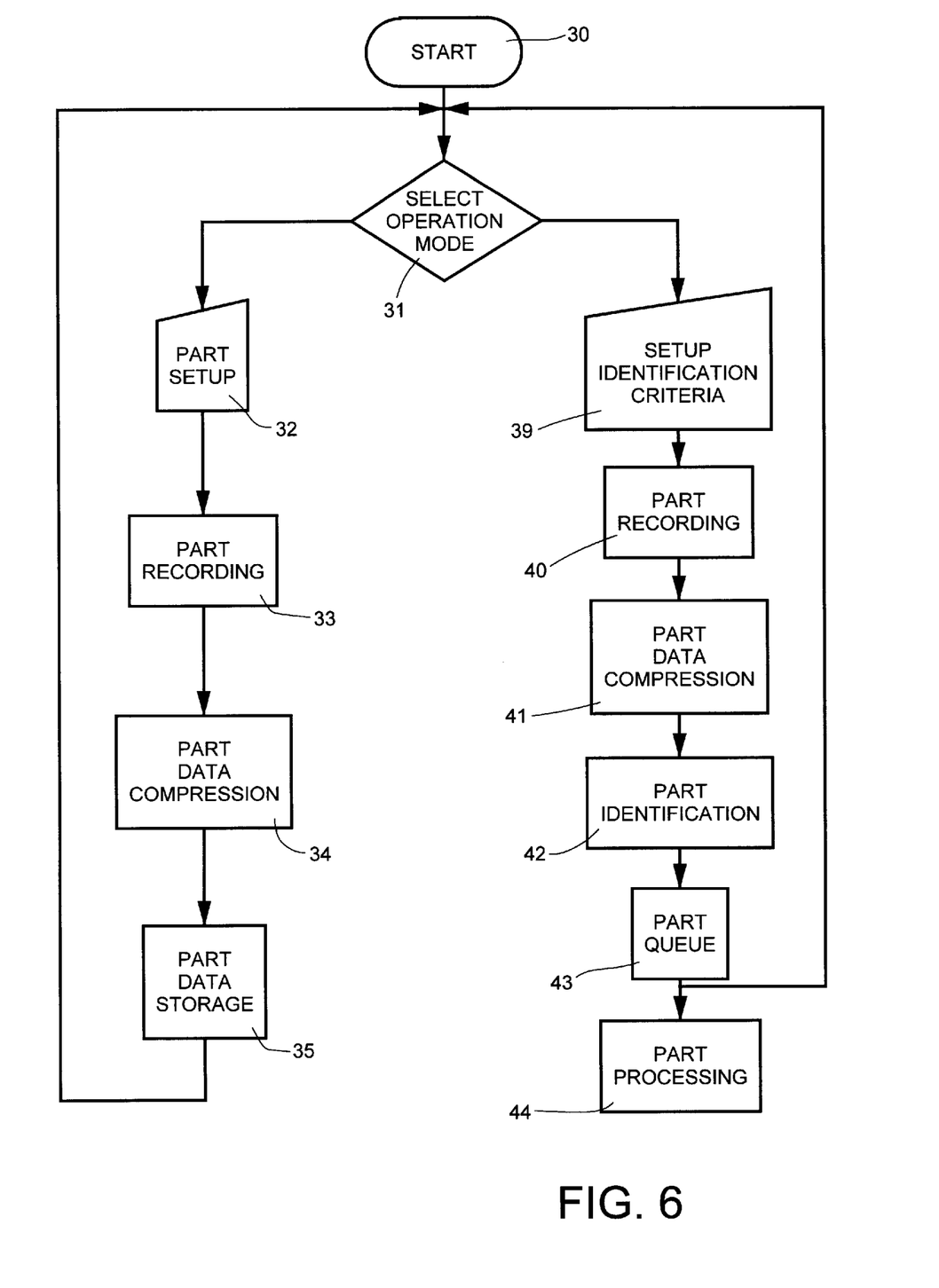
FIG. 6 is a flowchart showing basic system operation.
Figure 7:
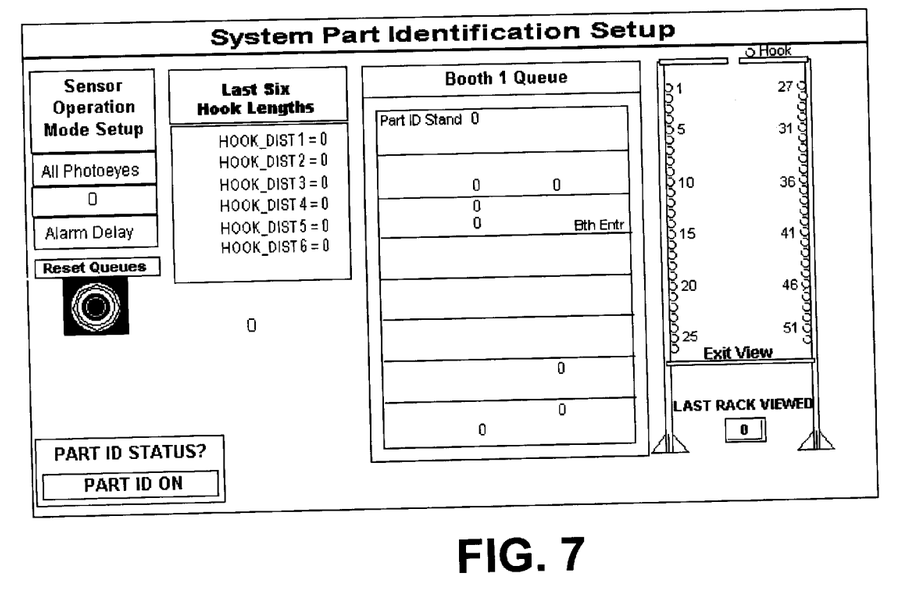
FIG. 7 is a representation of the one of the display screens displayed during system operation which relates to part identification setup.
Figure 8:
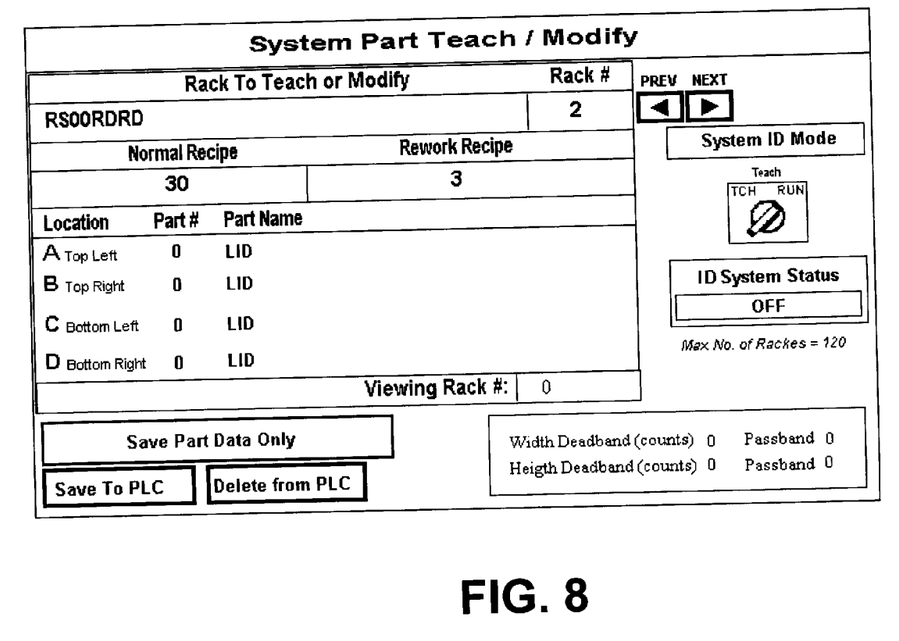
FIG. 8 is a representation of another display screen which relates to the system part teach or modify operation.
Figure 9:
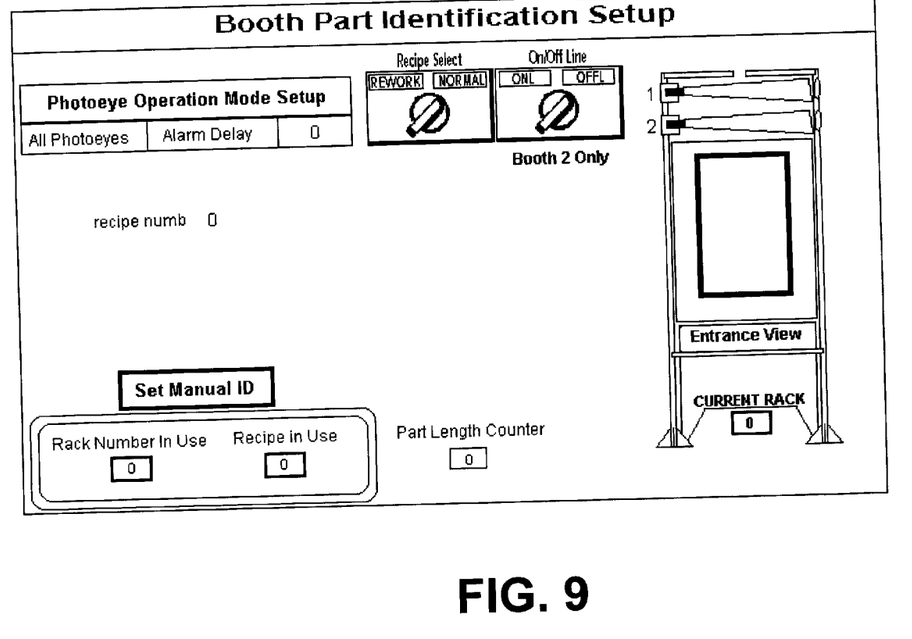
FIG. 9 is a representation of the booth part identification setup screen.
Figure 10:
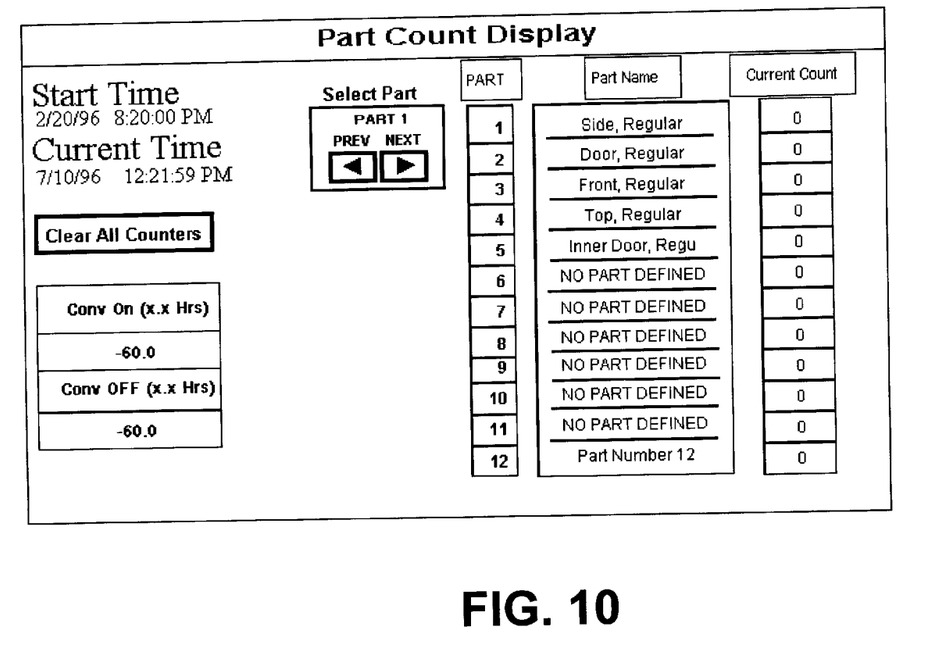
FIG. 10 is a representation of the part count screen.

The operation of the part identification system of the present invention can be understood with reference to the flowchart shown in FIG. 6 and the screen display representations shown in FIGS. 7–10.

With reference to the flowchart of FIG. 6, from the "Start" step 30, the operator selects one of the two operation modes for the system at step 31. This selection is accomplished from the system part teach/modify screen of FIG. 8 using the system mode switch 50. If the operator selects the "teach" mode at step 31, the system proceeds to the step 32 in which the operator assigns a part number corresponding to the part to be taught and sets of the processing information related to the part.

Following completion of the part setup at step 32, the system proceeds to step 33 in which a sample part is run through the sensor array 28. As the part travels through the array 17, the output of each sensor 18 is recorded for each conveyor movement increment, creating a matrix, such as the matrix 24. The recording starts whenever at least one sensor 18 detects a portion of an object. The recording stops whenever all sensors 18 are off. The length of the longest portion of the part thus defines the number of columns of the matrix. The number of sensors 18 defines the number of rows of the matrix.

Following the completion of step 33, the system proceeds to step 34 in which the data in the matrix is compressed into a sum or "sigma" format for the part. As explained above, the sigma format is generated by computing the sum of each of the rows and of each of the columns, to create a string of sum values.

After creating of the sigma data in step 34, the sigma data is stored in memory in step 35 along with the processing information for the part. The data is stored in a memory location corresponding to the part number specified. The information is input by the operator from the system part teach/modify screen of FIG. 8. The system preferably accommodates racks which comprises a plurality of individual parts, and the composition of these racks can be organized in the screen of FIG. 8 along with the individual parts that comprise each different rack. After the data has been stored, the system returns to step 31.

Following the input of sufficient data in the teach mode, the system can be run in the "identification" mode by selecting that mode at step 31 using the switch 50. When the identification mode is selected, the system proceeds to step 39 in which the operator inputs the "deadband" for the rows, the "passband" for the rows, the "deadband" for the columns. As explained above, the "deadband" is the absolute error allowed between the stored part sigmas and the sigmas of the part to be identified. If the error is within the "deadband", the sigma is considered to be a match. If the error is not within the "deadband", the sigma is considered to be a mismatch. The "passband" is the maximum number of mismatched sigmas allowed in order for the part to be identified.

Following the setup of the identification criteria in step 39, the system proceeds to step 40, in which part matrix data is recorded in essentially the same manner as step 33, but for parts passing through the sensor array 17 which need to be identified. Thereafter, the matrix data collected in step 40 is compressed to sigma data in step 41 in essentially the same manner as in step 34. System operation can be monitored from the system part identification setup screen shown in FIG. 7. This screen provides diagnostic information about the part identification system. In the implementation shown in FIG. 7, a sensor array comprising a total of 52 sensors are utilized with 26 on each side of the parts as they pass through the array. The screen of FIG. 7 also shows the operator the length of the last six racks of parts and provides an indication of any of the sensors is malfunctioning.

After generating the sigma format data for the part to be identified in step 41, the system proceeds to step 42, in which the part is identified. Using the row "deadband" and row "passband" values, and the column "deadband" and column "passband" values, the system checks each of the sigmas collected in step 41 with the corresponding sigma values stored in memory in step 35 until a matching part is found. A matching part is found if all sigmas are matched based upon the allowable "deadbands" and "passbands." If a matching part is found, the part number is loaded into a first-in-first-out queue in step 43. If no matching part is found, a default mismatch part number is used. The queue is shifted each time a new part is identified. One of the sensors 18 detects the presence of a part and loads the part number into the queue. The queue can be edited at any time to modify any part number. In step 44, when a part reaches the entrance to the spray booth 10, the corresponding part number from the queue is unloaded with the corresponding processing information and transferred to the spray booth control system 11 for further processing. This may be triggered by a additional photo sensors at the booth entrance, as shown in the booth part identification setup screen of FIG. 9.

Following the queue step 43, the control of the system returns to step 31, and, if the system continues to be set in the identification mode, the next part is identified.

If desired, the system may also maintain a count of individual parts that pass through the system. The parts would be identified as components of racks in the FIG. 8, and as each part is coated, the count of parts maintained and displayed using the part count display shown in FIG. 10.

While the parts identification system of the present invention has been shown as applied to a powder spray coating system, it should be understood that the system may have other applications in various types of coating systems as well as in other industrial applications in which it is necessary to identify various types of parts arriving at a processing station.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way that is inconsistent with the extent to which the progress in the art has been advanced by the invention.

What is claimed is:

1. A method of identifying parts comprising the steps of:
    moving the parts relative to an array of sensors;
    creating a plurality of sensor readings by sensing the presence or absence of a portion of one of the parts proximate to each of the sensors for a plurality of incremental distances that the parts have moved relative to the sensors;
    compressing the sensor readings according to a computational procedure to generate first and second compressed data for each of the parts, the first compressed data representing the sensor readings for all of the sensors during each incremental distance, and the second compressed data representing the sensor readings for all of the incremental distances of each of the sensors; and comparing the first and second compressed data with corresponding data for an identified part to determine if the part matches the identified part.

2. A method of identifying parts as recited in claim 1, comprising the additional step of first obtaining the first and second compressed data for the identified part by moving the identified part relative to the array of sensors, detecting the presence or absence of a portion of the identified part proximate to each of the sensors during a plurality of incremental distance, and compressing the sensor readings according to the computational procedure to generate first and second compressed data for the identifying part, the first compressed data representing the sensor readings for all of the sensors during each incremental distance, and the second compressed data representing the sensor readings for all of the incremental distance of each of the sensors.

3. A method of identifying parts as recited in claim 1, wherein a matrix is constructed from the sensor readings, the matrix having cells arranged in two dimensions, the two dimensions being rows and columns, and wherein the first compressed data is compressed column data and the second compressed data is compressed row data.

4. A method of identifying parts, comprising the steps of:
moving the parts relative to an array of sensors;
creating a plurality of sensor readings by sensing the presence or absence of a portion of one of the parts proximate to each of the sensors for a plurality of incremental distances that the parts have moved relative to the sensors;
constructing a matrix using information from the creating step, the matrix having cells arranged in two dimensions, the two dimensions being rows and columns, one of the dimensions representing one of the sensors, the other of the dimensions representing one of the incremental distance, each of the cells representing the reading of one of the sensors during one of the incremental distances;
compressing the sensor readings according to a computational procedure to generate compressed data for each of the parts the compressed data representing the sensor readings for all of the sensors during each incremental distance, and the compressed data representing the sensor readings for all of the incremental distances of each of the sensors; and
comparing the compressed data with corresponding data for an identified part to determine if the part matches the identified part.

5. A method of identifying parts as recited in claim 4, wherein the compressing step is performed by performing a computational procedure to the values of the cells in each of the columns to obtain compressed column data and performing the computational procedure to the values of the cells in each of the rows to obtain compressed row data; and wherein the comparing step is preformed by comparing the compressed row data and the compressed column data to corresponding compressed row data and compressed column data, respectively, for the identified part.

6. A method of identifying parts as recited in claim 5, wherein the computation procedure comprises summing the values of the cells in each column or row.

7. A method of identifying parts as recited in claim 5, wherein the compressed row data for the part is compared with the corresponding compressed row data for the identifying part and the row is passed if the compressed row data is within a deadband.

8. A method of identifying parts as recited in claim 7, wherein the deadband is adjustable.

9. A method of identifying parts as recited in claim 7, wherein the part is matched to the identifying part if the number of rows which are passed is within a passband.

10. A method of identifying parts as recited in claim 9, wherein the passband is adjustable.

11. A method of identifying parts as recited in claim 5, wherein the compressed column data for the part is compared with the corresponding compressed column data for the identifying part and the row is passed if the compressed column data is within a deadband.

12. A method of identifying parts as recited in claim 11, wherein the deadband is adjustable.

13. A method of identifying parts as recited in claim 11, wherein the part is matched to the identifying part if the number of columns which are passed is within a passband.

14. A method of identifying parts as recited in claim 13, wherein the passband is adjustable.

15. A method of recording identifying information for distinguishing a plurality of different parts comprising the steps of:
(a) moving one of the parts relative to an array of sensors;
(b) creating a plurality of sensor readings by sensing the presence or absence of a portion of the part proximate to each of the sensors for a plurality of incremental distances that the part has moved relative to the sensors;
(c) compressing the sensor readings according to a computational procedure to generate first and second compressed data for the part, the first compressed data representing the sensor readings for all of the sensors during each incremental distance, and the second compressed data representing the sensor readings for all of the incremental distances of each of the sensors; and
(d) repeating steps (a) through (c) for each part of the plurality of parts.

16. A method of recording identifying information for distinguishing a plurality of different parts, comprising the steps of:
(a) a moving one of the parts relative to an array of sensors;
(b) creating a plurality of sensor readings by sensing the presence or absence of a portion of the part proximate to each of the sensors for a plurality of incremental distances that the part has moved relative to the sensors;
(c) constructing a matrix using information from step (b), the matrix having cells arranged in two dimensions, the two dimensions being rows and columns, one of the dimensions representing one of the sensors, the other of the dimensions representing one of the incremental distances, each of the cells representing the reading of one of the sensors during one of the incremental distances;
(d) compressing the sensor readings according to a computational procedure to generate compressed data for the part, the compressed data representing the sensor readings for all of the sensors during each incremental distance, and the compressed data representing the sensor readings for all of the incremental distances of each of the sensors; and
(e) repeating steps (a) through (d) for each part of the plurality of parts.

17. A method of recording identifying information for distinguishing a plurality of different parts as recited in claim 16, wherein the compressing step is performed by performing a computational procedure to the values of the cells in each of the columns to obtain compressed column data and performing the computational procedure to the values of the cells in each of the rows to obtain compressed row data.

18. A method of recording identifying information for distinguishing a plurality of different parts as recited in claim 17, wherein the computation procedure comprises summing the values of the cells in each column or row.

19. A method of identifying parts comprising the steps of:
   (a) moving an identifying part relative to an array of sensors;
   (b) detecting the presence or absence of a portion of the identifying part proximate to each of the sensors for a plurality of incremental distances that the parts have moved relative to the sensors;
   (c) constructing a matrix using information from step (b), the matrix having cells arranged in two dimensions, the two dimensions being rows and columns, one of the dimensions representing one of the sensors, the other of the dimensions representing one of the incremental distances, each of the cells representing the reading of one of the sensors during one of the incremental distances;
   (d) performing a computational procedure to the values of the cells in each of the columns to obtain compressed column data and performing the computational procedure to the values of the cells in each of the rows to obtain compressed row data;
   (e) repeating steps (a) through (d) for each part to be identified; and
   (f) comparing the compressed row data and the compressed column data of each part to be identified with the corresponding compressed row data and compressed column data, respectively, for the identified part.

20. A method of identifying parts as recited in claim 19, wherein the computation procedure is summing each of the columns or rows.

21. A method of identifying parts as recited in claim 19, wherein the data is compared in step (f) by determining if the compressed row data of the part to be identified falls within a deadband around the compressed row data of the identified part.

22. A method of identifying parts as recited in claim 21, wherein the deadband is adjustable.

23. A method of identifying parts as recited in claim 21, wherein a row is considered to "pass" if the compressed row data of the part to be identified falls within a deadband around the compressed row data of the identified part, and the part to be identified is considered to be a match for the identified part if the number passed rows falls within a passband.

24. A method of identifying parts as recited in claim 23, wherein the passband is adjustable.

25. A method of identifying parts as recited in claim 19, wherein the data is compared in step (f) by determining if the compressed column data of the part to be identified falls within a deadband around the compressed column data of the identified part.

26. A method of identifying parts as recited in claim 25, wherein the deadband is adjustable.

27. A method of identifying parts as recited in claim 25, wherein a row is considered to "pass" if the compressed column data of the part to be identified falls within a deadband around the compressed column data of the identified part, and the part to be identified is considered to be a match for the identified part if the number passed columns falls within a passband.

28. A method of identifying parts as recited in claim 27, wherein the passband is adjustable.

29. A parts identification system, which comprises:
   an array of sensors through which parts are moved, the sensors providing a plurality of sensor readings by sensing the presence or absence of a portion of one of the parts proximate to each of the sensors for a plurality of incremental distances that the parts have moved relative to the sensors;
   means for compressing the sensor readings according to a computational procedure to generate first and second compressed data for each of the parts, the first compressed data representing the sensor readings for all of the sensors during each incremental distance, and the second compressed data representing the sensor readings for all of the incremental distances of each of the sensors; and
   means for comparing the first and second compressed data with corresponding data for an identified part to determine if the part matches the identified part.

30. A parts identification system as recited in claim 29, comprising in addition means for storing data collected on identified part during a teach mode for use by the comparing means.

31. A parts identification system, which comprises:
   an array of sensors through which parts are moved the sensors providing a plurality of sensor readings by sensing the presence or absence of a portion of one of the parts proximate to each of the sensors for a plurality of incremental distances that the parts have moved relative to the sensors;
   means for compressing the sensor readings according to a computational procedure to generate compressed data for each of the parts, the compressed data representing the sensor readings for all of the sensors during each incremental distance, and the compressed data representing the sensor readings for all of the incremental distances of each of the sensors;
   means for comparing the compressed data with corresponding data for an identified part to determine if the part matches the identified part, the comparing means using a deadband for determining if the compressed data matches the compressed data for the identified part; and
   means for adjusting the deadband.

32. A parts identification system, which comprises:
   an array of sensors through which parts are moved, the sensors providing a plurality of sensor readings by sensing the presence or absence of a portion of one of the parts proximate to each of the sensors for a plurality of incremental distances that the parts have moved relative to the sensors;
   means for compressing the sensor readings according to a computational procedure to generate compressed data for each of the parts, the compressed data representing the sensor readings for all of the sensors during each incremental distance, and the compressed data representing the sensor readings for all of the incremental distances of each of the sensors; and
   means for comparing the compressed data with corresponding data for an identified part to determine if the part matches the identified part, the comparing means using a passband to determine if the number of compressed data matches indicates that the part matches the identified part; and means for adjusting the passband.

33. A method of applying a spray coating to a part, comprising the steps of:

moving the part relative to an array of sensors;

creating a plurality of sensor readings by sensing the presence or absence of a portion the part proximate to each of the sensors for a plurality of incremental distances that the part is moved relative to the sensors;

constructing a matrix using information from the creating step, the matrix having cells arranged in two dimensions, the two dimensions being rows and columns, one of the dimensions representing one of the sensors, the other of the dimensions representing one of the incremental distance, each of the cells representing the reading of one of the sensors during one of the incremental distances;

compressing the sensor readings according to a computational procedure to generate compressed data for the part, the compressed data representing the sensor readings for all of the sensors during each incremental distance, and the compressed data representing the sensor readings for all of the incremental distances of each of the sensors;

comparing the compressed data for the part with compressed data for identified parts to match the compressed data for the part with compressed data for one of the identified parts; and using spray coating information associated with said one of the identified parts to apply a spray coating to the part.

* * * * *

UNITED STATES PATENT AND TRADEMARK OFFICE
CERTIFICATE OF CORRECTION

PATENT NO. : 5,905,651
DATED : May 18, 1999
INVENTOR(S) : Coulibaly et al.

It is certified that error appears in the above-identified patent and that said Letters Patent is hereby corrected as shown below:

Column 9, line 45, after "parts", insert a comma ",".
Column 10, line 44, after "(a)", delete the word "a".

Signed and Sealed this

Twenty-eighth Day of September, 1999

Attest:

Q. TODD DICKINSON

*Attesting Officer*   *Acting Commissioner of Patents and Trademarks*